Jan. 6, 1959 L. H. FLORA ET AL 2,867,258
THREADED FASTENER AND DEFORMABLE HOLDER THEREFOR
Filed Oct. 26, 1953 2 Sheets-Sheet 1

INVENTORS
LAURENCE H. FLORA
CHARLES A. KELLEY
BY
H. J. Lombard
ATTORNEY

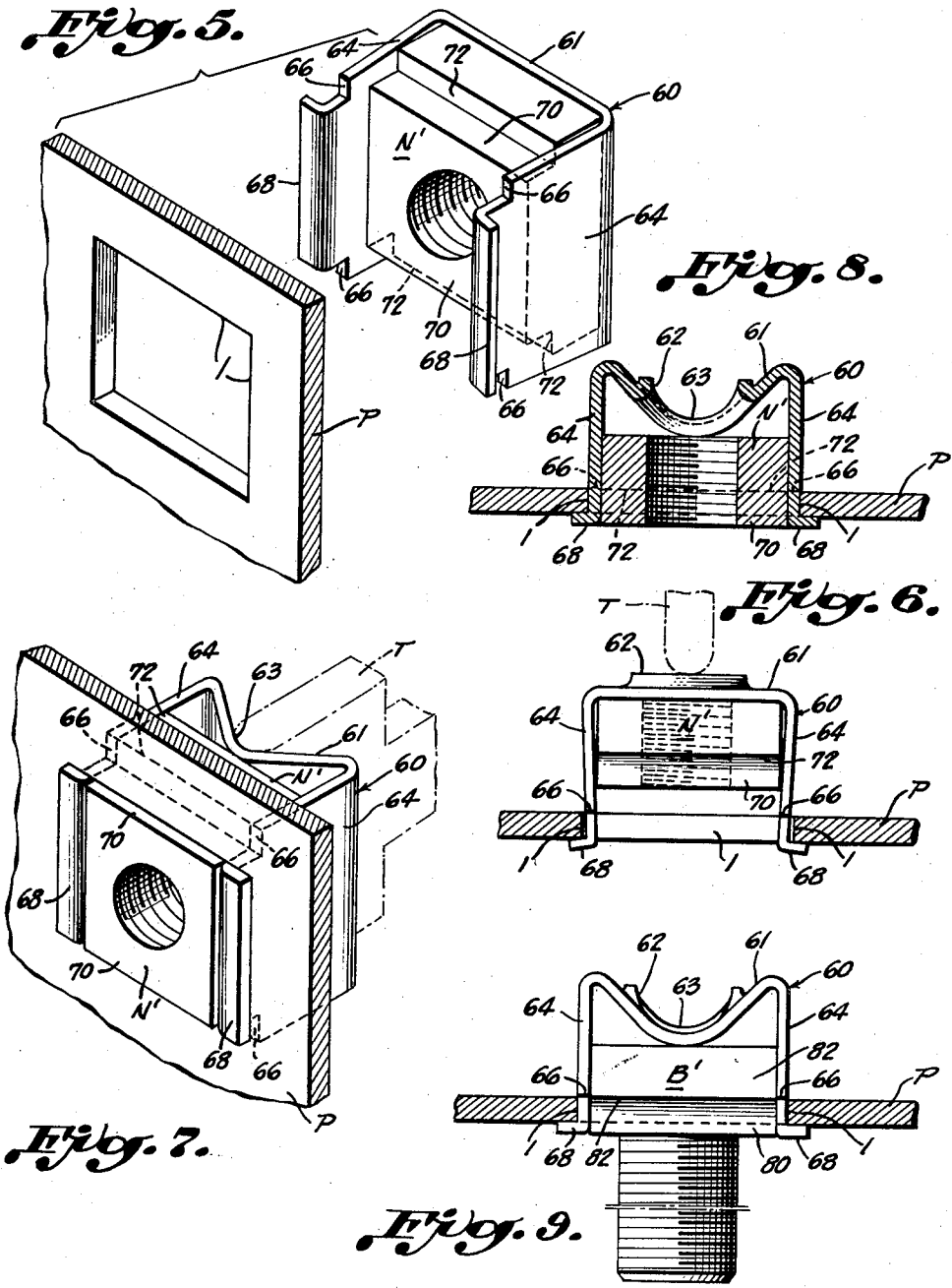

United States Patent Office 2,867,258
Patented Jan. 6, 1959

2,867,258
THREADED FASTENER AND DEFORMABLE HOLDER THEREFOR

Laurence H. Flora and Charles A. Kelley, Cleveland, Ohio, assignors to Tinnerman Products, Inc., Cleveland, Ohio, a corporation of Ohio Application October 26, 1953, Serial No. 388,307

2 Claims. (Cl. 151—41.74)

This invention relates in general to bolt and nut fastened installations and deals, more particularly, with improvements in fastening devices for attaching a nut or bolt in fastening position in an installation prior to the application of the cooperating bolt or nut thereto for securing the parts of the installation.

In many assemblies, it is necessary or desirable to use a standard nut and bolt fastening device but it is usually a difficult problem, especially in blind locations, for the operator to hold the bolt or nut in place as the cooperating fastener is applied thereto, or otherwise, to maintain the same against relative rotation during the final tightening of the fasteners. In such an assembly in which the rearward side of a part is not conveniently or readily accessible for holding a bolt or nut in fastening position prior to the application of the cooperating fastener, it has been the practice to resort to various forms of cage devices requiring a welding or riveting operation for attaching the same in providing means for holding the nut or bolt in fastening position. A welding or riveting operation requires inordinate time for attachment of the fasteners and, otherwise, involves considerably increased costs in manufacture which often make the use of this type of holder prohibitive in many installations requiring a cheap and inexpensive fastening means.

In United States Patent Number 2,391,046 issued December 18, 1945, there is disclosed a general form of nut holder which is installed in attached position on a support by an easy clip or snap fastening procedure that is much quicker and considerably cheaper than that involved in the use of the aforementioned cage devices requiring a costly and time consuming riveting or welding operation. In the use of nut holders constructed in accordance with this patent, it has been found in applications wherein a power driver is employed to apply a bolt into a previously attached nut, for example, that the impact of the power driver in the initial application of the bolt to the nut occasionally causes a displacement of the nut and nut holder from proper attached position. In accordance with the present invention, such nut holders and bolt holders are so constructed as to provide a positive permanent lock of the holder and the nut or bolt retained thereby in attached position and capable of withstanding such impact of a power driver or other force that might have a tendency to displace the nut or bolt from proper and effective attached position.

A primary object of this invention, therefore, is to provide a fastening device embodying a sheet metal holder or retainer for a nut or bolt head or other work clamping member, which comprises clip or snap fastened attaching means in the form of hooks, or the like, for attaching the nut or bolt in a work opening together with a portion of said holder that is adapted to be deformed into positive engagement with the nut or bolt head to lock the same in fully attached fastening position in the work opening.

A further object of the invention is to provide a fastening device comprising such a holder for a nut or bolt head in which the attaching hooks, or the like, extend completely free for easy and quick application to attached position in the work opening by a simple clip or snap fastening action, and which are adapted to be positively retained in attached position by manipulation of the nut or bolt head to expand said hooks, or the like, into anchored relation in the work opening together with a portion of said holder that is adapted to be deformed into positive engagement with the nut or bolt head to lock the same in fully attached fastening position in the work opening.

Another object of the invention is to provide a fastening device, as described, comprising a holder or retainer for a nut or bolt head or other work clamping member, which includes attaching means in the form of resilient arms carrying hooks, or the like, for attaching the nut or bolt head in a work opening together with a portion of said holder that is adapted to be deformed into positive engagement with the top of the nut or bolt head to lock the same in attached position in the work opening, and with locking shoulders provided on said spring arms adapted to engage the nut or bolt head to lock the same in attached position in cooperation with said deformed portion of the holder.

A further object of the invention is to provide a fastening device including such a holder for a nut or bolt head in which the attaching arms and hooks thereon are adapted to be positively retained in attached position by manipulation of the nut or bolt head to expand said hooks into anchored relation in the work opening together with a portion of said holder that is adapted to be deformed into engagement with the top of the nut or bolt head to lock the same in fully attached position in the work opening, and with locking shoulders provided on said holder arms adapted to engage the nut or bolt head to lock the same in attached position in cooperation with said deformed portion of the holder.

Further objects and advantages, and other new and useful features in the construction, arrangement and general combination of elements of the improved fastening devices of the invention will be apparent as the following description proceeds with reference to the accompanying drawings, for purposes of illustration but not of limitation, in which like reference characters designate like parts throughout, and in which:

Fig. 1 is a perspective view showing an assembled nut and nut holder in accordance with the invention in position to be attached in a work opening in a supporting plate or panel, or the like;

Fig. 5 is a perspective view showing a simplified form of fastening device in accordance with the invention in position to be attached in a work opening in a supporting plate or panel, or the like;

Fig. 6 is a sectional view through the supporting part showing the assembled nut and nut holder in side elevation as initially attached in the work opening, and with a tool in position to apply the same to fully attached fastening position;

Fig. 7 is a perspective view showing the assembled nut and nut holder of Fig. 6 as applied by the tool to fully attached fastening position in which a portion of the holder is deformed into engagement with the top of the nut to lock the same in applied position.

Fig. 8 is a vertical sectional view showing the fastening device of Fig. 6 as applied by the tool to its fully attached fastening position in which a portion of the holder is deformed into engagement with the top of the nut to lock the same in applied position; and Fig. 9 is a sectional view similar to Fig. 8 showing the same holder as employed for retaining a bolt in fully attached fastening position in a work opening.

Figure 1:
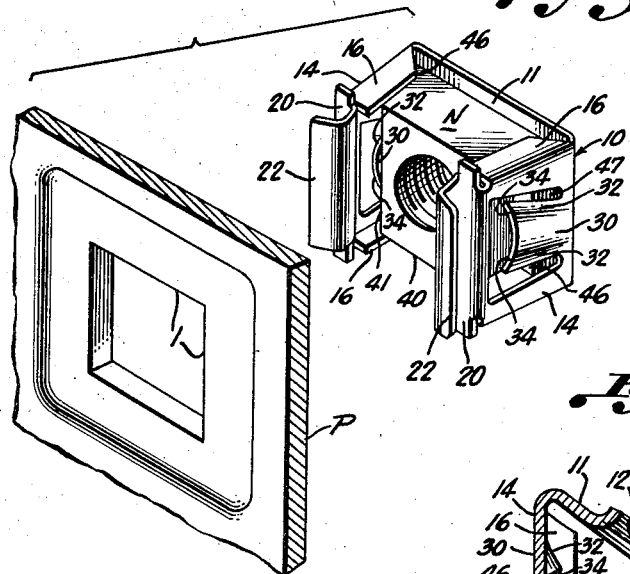
Figure 3:
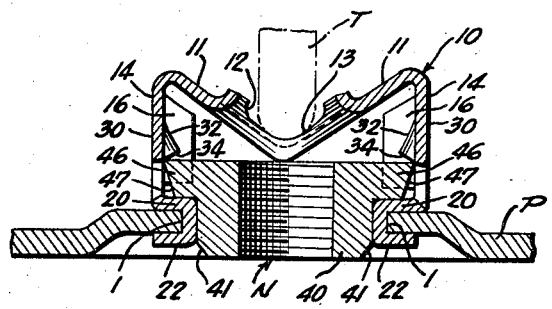
Fig. 3 is a vertical sectional view showing the nut as applied by the tool to its fully attached fastening position in which a portion of the holder is deformed into engagement with the nut to lock the same in such fully attached fastening position.
Figure 4:
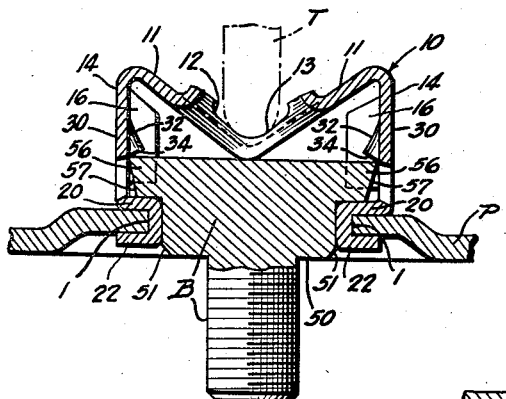
Fig. 4 is a sectional view similar to Fig. 3 showing the same holder as employed for retaining a bolt in applied fastening position.
Figure 2:
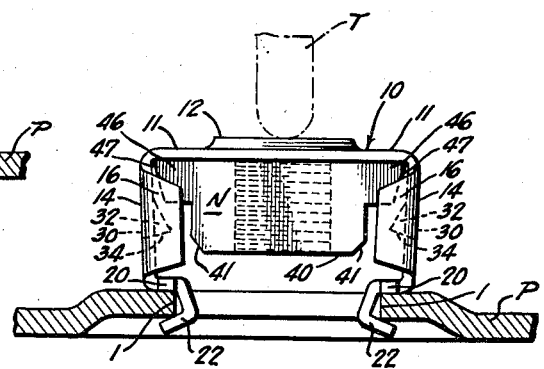
Fig. 2 is a sectional view through the supporting part showing the assembled nut and nut holder in side elevation as initially attached in the work opening, and with a tool shown in position to apply the fastening device to fully attached fastening position.

Referring now, more particularly, to the drawings, Figs. 1–3, inclusive, show a fastening device in accordance with the invention as provided for use as a holder or retainer 10 for a nut N. The holder 10 is constructed from a sheet metal section of a size and configuration determined by the shape and size of the nut N with which it is to be used and may be readily provided for use with various other nuts or equivalent work clamping members such as the head of a bolt B, as illustrated in Fig. 4, for example.

In the present example, the holder 10 is shown as constructed for use with the threaded nut N to be attached in fastening position over a generally rectangular work opening 1 in a supporting part such as a panel or plate P which preferably is countersunk in the area of said opening 1, as shown, so that said panel P is adapted to seat in flush relation to the part to which it is to be secured. The holder 10 may be readily constructed for attachment in a circular hole or other opening of any selected design but the use of a generally rectangular work opening, as shown, is advantageous in that it is relatively simple to form and otherwise provides for a fixed non-rotative attachment of the nut and nut holder in attached position.

The nut holder 10, is provided from a blank of any suitable sheet metal such as cold rolled steel having spring characteristics and adapted to be bent under tool force without cracking or breaking. The sheet metal blank forming the holder 10 is bent to provide a central base or body portion 11 having an enlarged bolt passage preferably defined by an annular outward flare 12, and end portions extending in the same general direction to form a pair of resilient arms 14 or end walls substantially normal to said central base portion 11 at the opposite ends of said nut N. The arms 14 are provided with side tabs or lugs 16 extending inwardly toward each other at the opposite sides of said nut N, and the lower end portions of said spring arms 14 are bent to define inwardly extending bottom wall portions 20 below said nut N merging with outwardly directed hooks 22, or the like, which are of a reduced width corresponding substantially to the width of the panel opening 1 so as to be readily received therein. In the normal untensioned relation of said arms 14, said hooks 22 are spaced apart a distance greater than the length of the panel opening 1 and are provided in a predetermined spacing from the bottom wall portions 20 corresponding substantially to the thickness of the panel P adjacent the panel opening 1 so as to cooperate with said bottom wall portions 20 in clasping marginal portions of said panel opening 1 in frictional engagement therewith. The arms 14, otherwise, extend from the central base or body portion 11 in entirely free and independent relation so that they may be readily flexed as necessary for an easy and quick initial attachment of the hooks 22 with the marginal portions of said panel opening 1, as shown in Fig. 2.

In the general form of holder 10, thus provided, the spring arms 14 may be spread apart as necessary to slip the nut N through the space between the hooks 22 on the ends thereof to a position in which the holder retains the nut N in the manner of a cage device defined by said arms 14, the side tabs or lugs 16 and the bottom wall portions 20, with the threaded opening in the nut N in line with the enlarged bolt passage 12 in the base 11 of the holder.

The arms 14 have the walls thereof stamped to provide locking elements in the form of resilient fingers 30, or the like, extending generally lengthwise of said arms 14. The fingers 30 are bent in the form of corrugations defining inwardly projecting wing portions 32 along the sides of said fingers terminating in inwardly projecting shoulders 34 on the ends of said wings 32. The shoulders 34 project inwardly from the walls of said arms 14 and are provided on said fingers 30 at predetermined locations as necessary to engage the top of the nut N in its fully attached fastening position in the work opening 1, as shown in Fig. 3.

The nut N has a generally T-shaped vertical cross section through the length thereof and comprises a body portion 40 merging with a larger collar or work clamping portion defined by laterally extending flanges 46. Said body portion 40 of the nut is substantially square in horizontal cross section and is adapted to enter into the panel opening 1 between the previously attached hooks 22 of the holder 10 as shown in Fig. 3, and this is facilitated by bevels 41 formed on the lower corners of said body portion 40. While the enlarged collar or work clamping portion on the upper part of the nut N is shown comprising a pair of laterally extending flanges 46, such a nut may be provided with similar flanges on all four sides thereof, if desired. In the present example, said nut N is provided with two laterally extending flanges 46 at the ends thereof which are adapted to overlap the panel opening 1 and prevent said nut N from being disengaged from the panel P in one direction. Disengagement in the other direction is prevented primarily by inward bending of the base 11 of the nut holder to provide an inwardly deformed base portion 13 in bearing engagement with the top of the nut N, as shown in Fig. 3, and by the shoulders 34 on the fingers 30 also engaging the top of said nut N in the fully attached fastening position thereof in the work opening 1. Preferably, the flange portions 46 of the nut N have their outer faces 47 tapered inwardly to provide suitable clearance for inward flexing of the spring arms 14 in the initial attachment of the hooks 22 in the panel opening 1.

The assembled nut and nut holder, Fig. 1, accordingly, is adapted to be easily and quickly applied to initially attached position in the panel opening 1 simply by compressing the arms 14 of the holder to move the hooks 22 on the ends thereof inwardly toward each other. In this relation, to obtain the required inward flexing of the arms 14, the nut N is held adjacent the base 11 of the holder by said arms gripping the upper corners of the flanges 46 of said nut, or by the engagement of said flanges 46 with the edges of the wings 32 projecting within said holder. When the spring arms 14 are compressed, the hooks 22 still have their extremities farther apart than the length of the panel opening 1. Consequently, in attaching the nut holder 10, one hook 22 is passed through the opening 1 with the other hook 22 resting on the surface of the panel adjacent said opening 1. The resilience of the arms 14 and the clearance thereof from the inwardly tapered end faces 47 of the nut N enables the latter hook 22 to be pressed inwardly and sprung sufficiently so that it may also be received in said opening 1. The spring arms 14 are then released from their compressed condition and in attempting to assume their normal untensioned relation, both hooks 22 spread apart and engage the adjacent marginal edges of the panel opening 1, as shown in Fig. 2, to retain the nut and nut holder 10 in initially attached position. The spring arms 14, as thus initially attached, do not assume their normal untensioned relation but rather, remain biased slightly inwardly in the engaged position of the hooks 22 in the panel opening 1, and thereby retain the nut N and, more particularly, the flanges 46 of said nut in spaced relation to the panel P by gripping engagement of said spring arms 14 with the upper corners of said flanges 46 on the nut N, or in a slightly lower position by engagement of the edges of the wings 32 on the fingers 30 of the holder with said flanges 46 on the nut.

In such initially attached position of the fastening device 10, the body portion 40 of said nut is substantially in line with the space between the hooks 22 and the panel opening 1. A tool T, illustrated in broken lines in Fig. 2, is applied to the outer surface of the base 11 across the passage 12 therein, and a suitable force on said tool T bends the base 11 of the holder into an inwardly deformed portion 13 engaging the top of the nut N and causes said nut to move to its fully attached fastening position, Fig. 3, in which the body portion 40 of said nut is wedged between the adjacent inner surfaces of the hooks 22 to force said hooks outwardly from the position shown in Fig. 2 to that of Fig. 3. The bevels 41 on said body portion 40 of the nut define pilot surfaces which produce a gradual outward camming of said hooks 22 leading to a ready drive fit of the body portion 40 of said nut N between said hooks 2 in the fully attached position of said nut N, as shown in Fig. 3. The flanges 46 of the nut N in such fully attached position, are seated in bearing engagement on the bottom wall portions 20 of the holder and, more particularly, in bearing relation with the work or panel P adjacent the panel opening 1.

In many instances, the inwardly bent or deformed base portion 13 of the holder in engagement with the top of the nut N is all that is necessary to provide a positive permanent lock of the nut in fully attached fastening position, whereupon the same holder may be provided without the fingers 30 defining the shoulders 34. The fingers 30 and shoulders 34 thereon are actually auxiliary locking elements supplementing the locking action of the inwardly bent base portion 13, and are employed where added strength and rigidity of the nut N in fully attached fastening position is necessary or desirable.

As the nut N is actuated by the tool T from the position shown in Fig. 2, the inwardly tapered end faces 47 on the flanges 46 of said nut N slide on the guide surfaces defined by the edges of the wings 32 to cause said wings 32 and the fingers 30 to flex outwardly as necessary to permit said flanges 46 of the nut N to pass over said shoulders 34 to the fully attached position of the nut as shown in Fig. 3. The fingers 30 and said shoulders 34 thereupon spring inwardly in attempting to assume their normal untensioned relation in a manner whereby said shoulders 34 snap into positive engagement with the top of the nut N, as shown in Fig. 3. The shoulders 34, accordingly, cooperate with the aforesaid inwardly bent or deformed base portion 13 of the holder to provide a positive permanent lock of the nut N in its fully attached fastening position against displacement by any likely force which might otherwise cause dislocation or removal thereof from such fully attached position, as, for example, when subjected to a severe impact taking place in the use of a power tool for applying the associated bolt to said nut N.

As shown in Fig. 4, the improved holder 10 is equally adapted to use as a retainer for a bolt B having a head approximating the size and proportions of the nut N which is used as disclosed with reference to Figs. 1–3, inclusive. The head of the bolt B has a similar body portion 50 adapted to enter into the panel opening 1 between the previously attached hooks 22 of said holder 10, with this action being facilitated by bevels 51 formed on the lower corners of said body portion 50. The collar or work clamping portion on the bolt head comprises a pair of similar laterally extending flanges 56 having tapered end faces 57 which provide suitable clearance for inward flexing of the resilient arms 14 of the holder 10 in the initial attachment thereof in the panel opening 1. The head of the bolt B, thus provided, is readily assembled in the holder 10 between the spring arms 14 and this assembly, accordingly, easily and quickly secured in the panel opening 1, as shown in Fig. 4, in the same general procedure described with reference to Figs. 1–3, inclusive, with a suitable tool T being employed to force the bolt head to its fully attached fastening position in which the inwardly bent base portion 13 of the holder and the shoulders 34 on the fingers 30 engage the top of the bolt head to provide a positive permanent lock of said bolt B in such fully attached fastening position against displacement or removal.

Figs. 5–9, inclusive show another form of fastening device in accordance with the invention wherein the holder 60 is provided in a simplified, cheaper construction for a more or less standard type of nut or bolt head having portions cutaway to adapt the same for application and use substantially in the manner described with reference to Figs. 1–4, inclusive.

The holder 60 is provided in an advantageous relatively cheaper construction in that it is made from a strip-like blank obtained from standard sheet metal strip stock with little loss or waste of material. The strip of sheet metal forming the holder 60 is bent to provide a central base or body portion 61 having an enlarged bolt passage preferably defined by an annular outward flare 62, and end portions extending in the same general direction to form a pair of resilient arms 64 or end walls substantially normal to said base 61 at the opposite ends of the nut N'. The arms 64 taper slightly inwardly toward each other at the opposite ends of said nut N', and the lower end portions of said arms 14 are cutaway to define abutments 66 below said nut N' adjoining outwardly directed hooks 68, or the like, which are of a reduced width corresponding substantially to the width of the panel opening 1 so as to be readily received therein. In the normal untensioned relation of said resilient arms 64, the hooks 68 are spaced apart a distance greater than the length of the panel opening 1 and are provided in a predetermined spacing from the abutments 66 corresponding substantially to the thickness of the panel P adjacent the panel opening 1 so as to cooperate with said abutments 66 in engaging opposite surfaces of said panel P bordering said panel opening 1 in frictional engagement therewith. The resilient arms 64, otherwise, extend from said base 61 in entirely free and independent relation so that they may be readily flexed as necessary for an easy and quick initial attachment of the hooks 68 with the marginal portions of said panel opening 1, as shown in Fig. 6.

In the general form of holder 60, thus provided, the arms 14 may be readily spread apart to slip the nut N' through the space between the hooks 68 on the ends thereof to a position in which the holder retains the nut N' adjacent the base 61 in the manner of a cage device with the threaded opening in said nut in line with the enlarged bolt passage 62 in said base 61 of the holder.

The nut N' has a generally T-shaped transverse cross section comprising a body portion 70 merging with a larger collar or work clamping portion defined by projecting side flanges 72. Said body portion 70 of the nut is substantially rectangular in horizontal cross section and is adapted to enter into the panel opening 1 between the previously attached hooks 68 of the holder 60, as shown in Figs. 7 and 8, with the flanges 72 bearing on the panel P in overlapping relation to the panel opening 1, thereby preventing said nut N' from being disengaged from the panel P in one direction. Disengagement in the other direction, is prevented by inward bending of the base 61 of the nut holder to provide an inwardly deformed base portion 63 bearing on the top of the nut N', Figs. 7 and 8, to lock the nut permanently in fully attached fastening position.

The assembled nut and nut holder, Fig. 5, accordingly, is adapted to be easily and quickly attached in the panel opening 1 simply by compressing the arms 64 to move the hooks 68 on the ends thereof inwardly toward each other. In this relation, to obtain the required inward flexing of the arms 64, the nut N' is held adjacent the base 61 of the holder by the inwardly tapered formation of said arms 64 in gripping engagement with the end faces and lower corner edges of said nut N', as illustrated in Figs. 1 and 6. When the resilient arms 14 are compressed, the hooks 68 still have their extremities farther apart than the length of the panel opening 1. Accordingly, in attaching the nut holder 60, one hook 68 is passed through the opening 1 to engage the inner surface of the panel P with the adjacent abutments 66 bearing on the outer surface of said panel, and with the other hook 68 resting on said outer surface of the panel outside of said opening 1. The resilience of the spring arms 64 below the nut N' enables the latter hook 68 to be pressed inwardly and sprung sufficiently so that it may also be received in said opening 1 to engage the inner surface of the panel with the adjacent abutments 66 bearing on the outer surface of said panel P. The resilient arms 14 are then released from their compressed condition, and in attempting to assume their normal untensioned relation, both hooks 68 spread apart and engage the adjacent marginal edges of the panel opening 1, as shown in Fig. 6, to retain the nut N' and nut holder 60 in initially attached position. The spring arms 64, as thus initially attached, do not assume their normal untensioned relation but rather, remain biased slightly inwardly in the engaged position of the hooks 68 in the panel opening 1 and thereby retain the nut N' and, more particularly, the flanges 72 of said nut in spaced relation to the panel P by gripping engagement of said arms 64 with the end faces and lower corner edges on the nut N', as aforesaid.

In such initially attached position of the fastening device, the body portion 70 of said nut is substantially in line with the space between the hooks 68 and the panel opening 1. A tool T, illustrated in broken lines in Figs. 6 and 7, is applied to the outer surface of the base 61 across the passage 62 therein, and a suitable force on the tool T bends the base 61 of the holder into an inwardly deformed portion 63 engaging the top of the nut N' and causes said nut N' to move to its fully attached fastening position, shown in Figs. 7 and 8, in which the body portion 70 of said nut is wedged between the adjacent inner surfaces of the hooks 68 to force said hooks outwardly from the position shown in Fig. 6 to that of Fig. 8. The flanges 72 of the nut N' in such fully attached position, are seated in direct bearing engagement on the panel P in overlapping relation to the panel opening 1 while the inwardly bent base portion 63 bears against the top of the nut N' to lock the same in fully attached fastening position.

Fig. 9 illustrates the holder 60 as employed as a retainer for a bolt B' having a head approximating the size and proportions of the nut N' which is used as disclosed with reference to Figs. 5–8, inclusive. The head of the bolt B' has a similar body portion 80 adapted to enter into the panel opening 1 between the previously attached hooks 68 of said holder 60 and a collar or work clamping portion comprising a pair of laterally extending flanges 82 adapted to overlap the marginal portions of said panel opening 1 in direct bearing relation on the panel P. The head of the bolt B, thus provided, is readily assembled in the holder 60 between the spring arms 64 and this assembly, accordingly, easily and quickly secured in the panel opening 1, as shown in Fig. 9, in the same general procedure described with reference to Figs. 5–9, inclusive, with a suitable tool T being employed to force the bolt head to its fully attached fastening position in which the inwardly bent or deformed base portion 63 of the holder engages the top of the bolt head B to provide a positive permanent lock of said bolt B in fully attached fastening position.

While the invention has been described in detail with specific examples, such examples are intended as illustrations only inasmuch as the invention fully contemplates various modifications which may be provided without departing from the spirit and scope of the invention.

What is claimed is:

1. A fastening assembly including a work part having a work opening therein and a fastening device, said fastening device comprising a nut or bolt head and a holder attaching said nut or bolt head in the work opening, said nut or bolt head comprising a body portion and at least one projecting flange and said holder comprising a strip of sheet metal formed into a base portion extending across the top of the nut or bolt head and arms extending from opposite edges of said base and in clasping relation to said nut or bolt head, said arms extending a distance substantially greater than the axial length of said nut or bolt head and having ends of reduced width defining outwardly directed attaching hooks received in holding relation in the work opening and abutments on edges of said arms bearing on the work part outside of the work opening, said nut or bolt head being disposed in wedging relation between said arms to force the latter outwardly and into engagement with confronting defining surfaces of the work opening, said base being collapsed intermediate said arms in a direction generally normal to the plane of said base and toward the free ends of said arms, said collapsed base defining a downwardly deformed bearing portion engaging the top of said nut or bolt head to prevent movement of said nut or bolt head away from the work in one direction while engagement of said flange with the work part limits movement of said nut or bolt head with respect to the work part in the opposite direction.

2. A fastening assembly including a work panel having a work opening therein and a fastening device, said device comprising a nut or bolt head and a holder attaching said nut or bolt head in the work opening, said nut or bolt head comprising a body portion and projecting flanges and said holder comprising a strip of sheet metal bent into a base portion extending across the top of the nut or bolt head and arms extending from opposite edges of said base and in clasping relation to said nut or bolt head, said arms extending a distance substantially greater than the axial length of said nut or bolt head and having ends of reduced width defining outwardly directed attaching hooks received in holding relation in the work opening and abutments on the outer edges of said arms at opposite sides of said hooks bearing on the work panel outside of the work opening, said nut or bolt head being disposed in wedging relation between said arms whereby the latter are forced outwardly into engagement with confronting defining surfaces of the work opening and with said flanges on the nut or bolt head in bearing relation with the work panel, said base being collapsed intermediate said arms in a direction generally normal to the plane of the base and toward the free ends of said arms, said collapsed base defining a downwardly deformed projection engaging the top surface of said nut or bolt head and limiting movement of said nut or bolt head in a direction away from the work panel, while the engagement of said flanges with the work panel limit movement of said nut or bolt head in the opposite direction, to retain the same against displacement from fully attached position.

References Cited in the file of this patent
UNITED STATES PATENTS

| | | |
|---|---|---|
| 1,742,131 | Carr | Dec. 31, 1929 |
| 1,768,505 | Carr | June 24, 1930 |
| 1,826,705 | Carr | Oct. 13, 1931 |
| 2,404,372 | Hallock | July 23, 1946 |
| 2,495,037 | Tinnerman | Jan. 17, 1950 |
| 2,633,174 | Poupitch | Mar. 31, 1953 |
| 2,635,666 | Murphy | Apr. 21, 1953 |
| 2,678,075 | Murphy | May 11, 1954 |